(12) United States Patent
He

(10) Patent No.: US 6,704,316 B1
(45) Date of Patent: Mar. 9, 2004

(54) PUSH-OUT TECHNIQUE FOR SHARED MEMORY BUFFER MANAGEMENT IN A NETWORK NODE

(75) Inventor: Linhai He, Piscataway, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 790 days.

(21) Appl. No.: 09/124,278

(22) Filed: Jul. 29, 1998

(51) Int. Cl.[7] .................................................. H04J 3/00
(52) U.S. Cl. ........................ 370/397; 370/60; 370/94.1; 709/218
(58) Field of Search ......................... 370/60, 94.1, 397; 709/218, 234, 203, 201, 220

(56) References Cited

U.S. PATENT DOCUMENTS 5,136,584 A * 8/1992 Hedhund .................... 370/94.1
5,140,583 A * 8/1992 May et al. ..................... 370/60
5,959,993 A * 9/1999 Varma et al. ................ 370/397

OTHER PUBLICATIONS

Choudhury, Abhijit K., and Hahne, Ellen L., Dynamic Queue Length Thresholds for Multipriority Traffic, 15th International Teletraffic Congress, Washington, D.C., Jun. 1997, pp. 561–569.
Chao, H. Jonathan, and Uzun, Necdet, An ATM Queue Manager Handling Multiple Delay and Loss Priorities, IEEE/ACM Transactions on Networking, vol. 3, No. 6, Dec. 1995, pp. 652–659.
Wu, Guo–Liang, and Mark, Jon W., A Buffer Allocation Scheme for ATM Networks: Complete Sharing Based on Virtual Partition, IEEE/ACM Transactions on Networking, vol. 3, No. 6, Dec. 1995, pp. 660–669.
Beraldi, Roberto, Iera, Antonio, and Marano, Salvatore, "Push–Out Based" Strategies for Controlling the Share of Buffer Space, Proceedings of IEEE Singapore International Conference on Networks/International Conference on Information Engineering 1993, p. 39–43, vol. 1.
U.S. patent application Ser. No. 08/736,149, filed Oct. 24, 1996, entitled Method for Shared Memory Management in Netowrk Nodes.

* cited by examiner

Primary Examiner—Hosain Alam
Assistant Examiner—Khanh Quang Dinh

(57) ABSTRACT

A network node having a shared memory buffer for the temporary storage of data packets is configured to implement a push out technique for implementing different loss priorities among traffic classes. When a data packet is stored in a connection queue in the buffer, a weighted queue length associated with that connection queue is incremented by a weight value associated with the connection. When a data packet is removed from a connection queue, the weighted queue length associated with that connection queue is decremented by the weight value associated with the connection. When a data packet arrives at the network node but there is not enough room in the buffer, a data packet is removed from the connection queue having the maximum weighted queue length to make room in the buffer for the newly arrived data packet. Loss priorities are implemented by the appropriate provisioning of weights to traffic classes and by appropriate initialization of weighted queue lengths.

32 Claims, 2 Drawing Sheets

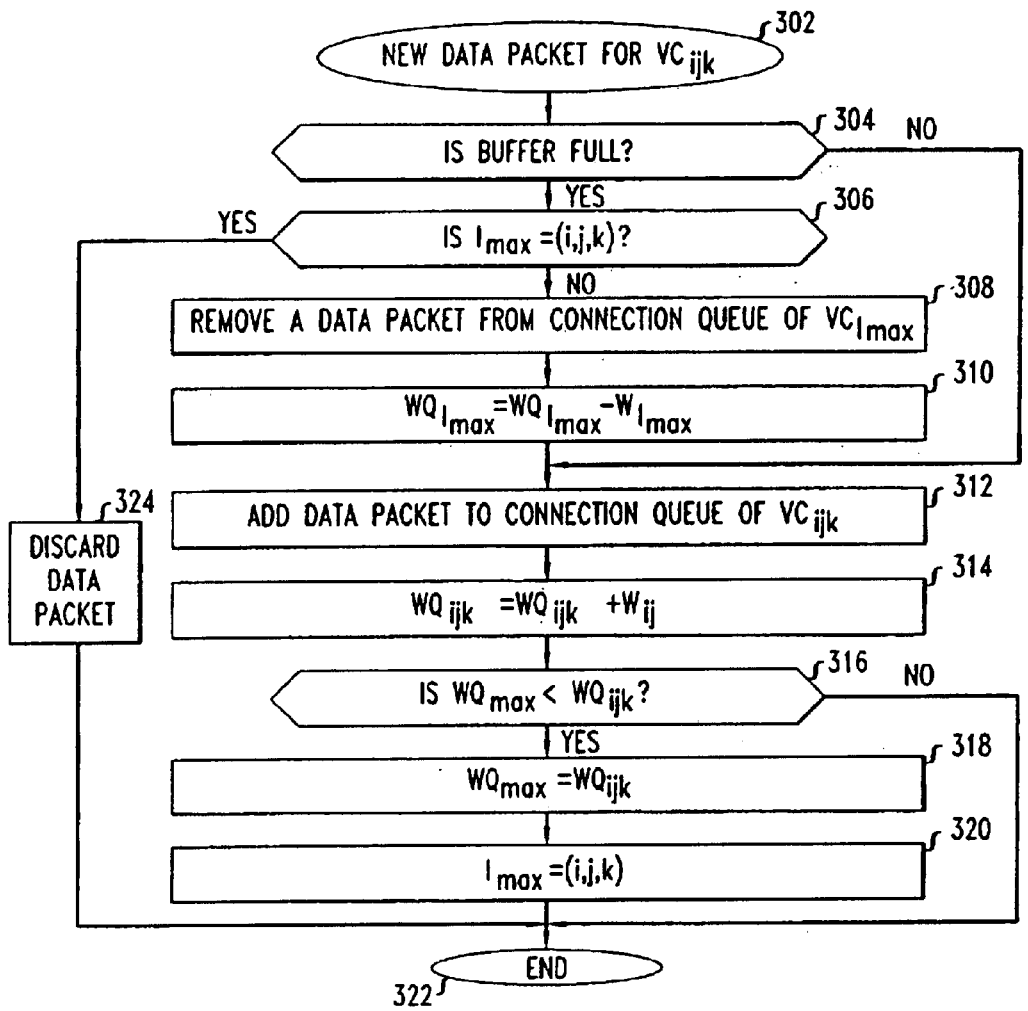
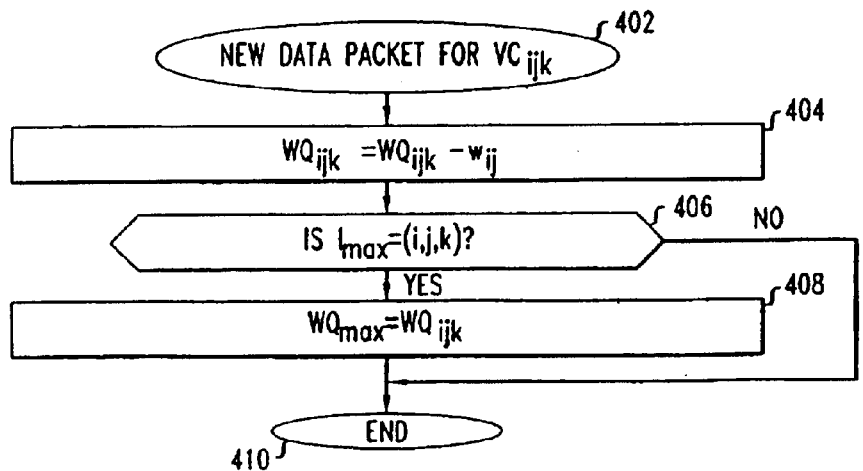

PUSH-OUT TECHNIQUE FOR SHARED MEMORY BUFFER MANAGEMENT IN A NETWORK NODE

FIELD OF THE INVENTION

The present invention relates generally to shared memory buffer management in network nodes. More particularly, the present invention relates to a push-out technique for shared memory buffer management in network nodes.

BACKGROUND OF THE INVENTION

Data networks are used to transmit information between two or more endpoints connected to the network. The data is transmitted in packets, with each packet containing a header describing, among other things, the source and destination of the data packet, and a body containing the actual data. The data can represent various forms of information, such as text, graphics, audio, or video.

Data networks are generally made up of multiple network nodes connected by links. The data packets travel between endpoints by traversing the various nodes and links of the network. Thus, when a data packet enters a network node, the destination information in the header of the packet instructs the node as to the next destination for that data packet. A single data packet may traverse many network nodes prior to reaching its final destination.

Each network node may have multiple input ports and output ports. As a data packet is received at a network node, it is transmitted to its next destination in the network via an appropriate output port of the node. Depending on the amount and nature of the data packets entering a network node, it is possible that the node will not be able to output the data packets at a rate sufficient to keep up with the rate that the data packets are received. In the simplest design of a network node, newly arriving data packets may simply be discarded if the output rate of the node cannot keep up with the rate of receipt of new packets.

More advanced network nodes have a buffer stored in a memory of the network node such that data packets may be held in a queue prior to being output from the node. In such a configuration, if data packets are received at a rate faster than the node is able to output the data packets, the newly received data packets are queued in a memory buffer of the node until such time as they may be transmitted. However, since the buffer is of a finite size, it is still possible that the rate of receipt will be such that the buffer will become full. One solution is to drop any new incoming data packets when the buffer is full. However, one problem with this solution is that it may be desirable to give different types of data packets different priorities. For example, if data packets are carrying a residential telephone call, it may be acceptable to drop a data packet periodically because the degradation in service may not be noticeable by the people engaging in the conversation. However, if the data packets are carrying data for a high speed computer application, the loss of even one data packet may corrupt the data resulting in a severe problem.

As a result of the need to differentiate the types of data packets, different data packets may be associated with different traffic classes. A traffic class is a description of the type of service the data packets are providing, and each traffic class may be associated with a different loss priority. For example, a traffic class of "residential telephone" may have a relatively low loss priority as compared with a traffic class of "high speed data".

There are various configurations of network nodes which use buffers to store incoming data packets. One such configuration is called a shared memory architecture. In such an architecture, each output port has one or more associated queues stored in buffer memory of the network node. Further, the area of memory set aside for buffer space is shared by the queues of multiple output ports. Thus, the total available buffer memory space is shared among the different output ports. For network nodes with a shared memory architecture, buffer management techniques are needed to regulate the sharing of buffer memory among the different output ports. Such techniques need to take into account the different traffic classes with their different loss priorities.

One technique, known as a threshold-based technique, allows all new packets to be stored in the buffer until the buffer is filled to a certain percentage of its size. Once this threshold is reached, then only data packets above a certain loss priority will be accepted. In this way, a certain amount of buffer space is reserved for high priority data packets. Such a threshold-based technique is described in U.S. patent application Ser. No. 08/736,149, filed Oct. 24, 1996, entitled Method for Shared Memory Management in Network Nodes, which is assigned to the same assignee as the present invention. In the technique described in the copending application, each queue is allocated some nominal buffer size for incoming data packets. If the addition of a new data packet would exceed the nominal buffer size, the queue may be allocated additional buffer space if the total free buffer space remains below a certain threshold. This threshold may be different depending on the traffic class of the queues. One of the problems with threshold-based techniques is that they do not adapt well to changing traffic conditions. In addition, the performance of these techniques depends largely on the chosen values of the thresholds, which values are difficult to choose and which are usually provisioned empirically.

Another memory management technique called push-out is generally more efficient than threshold techniques. In a push-out technique, low priority data packets which are already in a queue may be removed in order to make room for newly arriving higher priority data packets. One such push-out technique is described in Beraldi, R., Iera, A., Marano, S., *"Push-Out Based" Strategies for Controlling the Share of Buffer Space,* Proceedings of IEEE Singapore International Conference on Networks/International Conference on Information Engineering '93, p. 39–43, vol. 1. One of the problems with existing push-out techniques is that if there is heavy traffic of high priority data packets, the high priority data packets could starve the low priority data packets such that the low priority data packets will not make it through the queue to an output port.

SUMMARY OF THE INVENTION

The present invention provides an improved push-out technique for memory management in a shared memory network node. In accordance with the invention, a weighted queue length is maintained in memory for each queue stored in the shared memory buffer. When a new data packet arrives at the network node to be stored in its appropriate queue and the buffer is full, a data packet is removed from the queue having the largest weighted queue length. This makes room in the buffer for the newly arrived data packet to be stored in its appropriate queue.

The weighted queue length is maintained by adjusting the weighted queue length of a queue by an amount equal to the weight assigned to the traffic class of the data packet. These weights may be provisioned in order to implement different loss priorities among the traffic classes. In addition, the same traffic class may be assigned a different weight at two different output ports of the node, thus giving further flexibility and control over the loss priorities among output ports.

In accordance with another aspect of the invention, initial values of weighted queue lengths may be assigned in order to further control the memory management. The assignment of an initial weighted queue length allocates a nominal buffer space to a queue.

These and other advantages of the invention will be apparent to those of ordinary skill in the art by reference to the following detailed description and the accompanying drawings.

BRIEF DESCRIPTION OF THE DRAWINGS

FIG. 3 is a flowchart showing the steps performed by the network node in accordance with the present invention; and FIG. 4 is a flowchart showing the steps performed by the network node when a data packet is removed.

DETAILED DESCRIPTION

Figure 1:
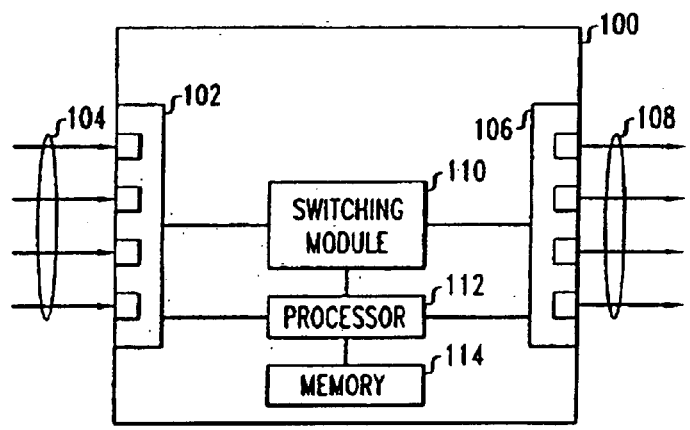
FIG. 1 shows a high level block diagram of a network node configured to operate in accordance with the present invention.

A high level block diagram of a network node configured to operate in accordance with the present invention is shown in FIG. 1. Network node 100 includes input ports 102 for receiving data packets from input links 104. Network node 100 also includes output ports 106 for transmitting data packets on output links 108. Switching module 110 is connected to input ports 102 and output ports 106 for switching data packets received on any input link 104 to any output link 108. A processor 112 is connected to a memory unit 114, input ports 102, switching module 110, and output ports 106. The processor controls the overall functioning of the network node 100 by executing computer program instructions stored in memory 114. Although memory 114 is shown in FIG. 1 as a single element, memory 114 may be made up of several memory units. Further, memory 114 may be made up of different types of memory, such as random access memory (RAM), read-only memory (ROM), magnetic disk storage, optical disk storage, or any other type of computer storage. One skilled in the art will recognize that FIG. 1 is a high level functional diagram of a network node configured to operate in accordance with the present invention. An actual network node would have additional elements in order to perform all the functions of a network node, however such additional elements are not shown in FIG. 1 for clarity.

In operation, as data packets are received at input ports 102 via input links 104, processor 112 will determine the appropriate output link 108 on which to output the data packet, and the processor will control switch module 110 in an appropriate manner so that the data packet is sent out on the appropriate output port 106 and output link 108. However, data packets may arrive at network node 100 at a rate which is faster than the network node 100 can output the data packets. Therefore, at least a portion of memory 114 is configured as a buffer, so that received data packets may be stored in the buffer until ready to be output. However, it is possible that the rate of receipt of data packets will be high enough such that the buffer will fill up. In such a case, some data packets will be lost. The present invention provides a technique for managing a data packet buffer in a network node 100 for efficient use of allocated buffer memory.

Figure 2:
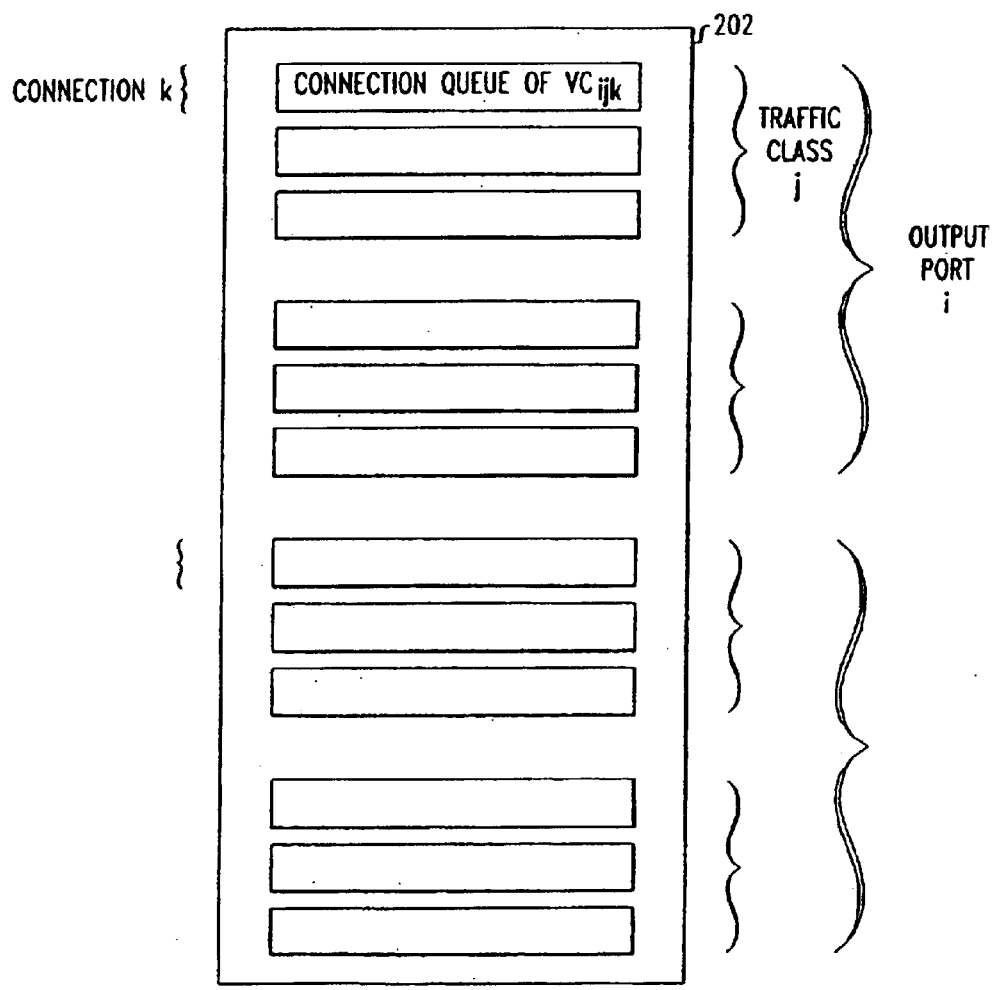
FIG. 2 shows a logical diagram of allocated buffer memory within the memory of the network node.

FIG. 2 shows a logical diagram of allocated buffer memory 202 within the memory 114 of network node 100 in accordance with the present invention. The buffer 202 is an area of memory which is set aside for the temporary storage of data packets which are received by the network node. In accordance with the present invention, a separate queue is maintained in the buffer for each connection being serviced by the network node. A connection is a logical circuit connecting a pair of communicating devices in the network. Such a connection is also sometimes referred to as a virtual circuit (VC). In a data packet network, no actual dedicated circuit is provisioned between any two communicating devices. Instead, the links and nodes of the network are shared among all users of the network, yet it appears to a pair of communicating devices that a dedicated communication path exists between them. Thus, for example, if a user is browsing an Internet World Wide Web site, the logical link between the user and the web server is a connection. Similarly, if two computers are transmitting data to/from each other, that logical link is also a connection.

A high level description of the invention will be described at this point. A detailed description of the steps to be performed by a network node in accordance with the invention will be described below in connection with the flowchart of FIG. 3. The invention is a push-out technique which may be implemented in a network node with a shared memory architecture in which multiple output ports share a single buffer. Within each output port, each connection has its own connection queue for the storage of data packets. The connections are assigned to different traffic classes, each of which may have a different loss requirement. In any push-out technique, the key issue is which data packet should be removed from the buffer (i.e. pushed-out) in order to make space for newly arriving data packets, while at the same time enforcing the provisioned loss priorities and ensuring fairness among the different connections. The present invention makes this determination based on the concept of weighted queue length as follows. First, each traffic class is assigned a weight based on its loss priority, with small weights corresponding to high priorities. This weight assignment may be provisioned on a per output port basis so that the same traffic class at different output ports may have different priorities. A weighted queue length is maintained for each connection queue stored in the buffer. When a data packet associated with a particular connection arrives at the network node, the data packet is stored in the associated connection queue and the weighted queue length of the connection queue is incremented by an amount equal to the weight assigned to the traffic class of the connection. Similarly, when a data packet associated with a particular connection departs from the network node, the data packet is removed from the associated connection queue and the weighted queue length of the connection queue is decremented by an amount equal to the weight assigned to the traffic class of the connection. The initial value of the weighted queue length for a connection queue is assigned according to a nominal buffer allocation for the connection. This nominal buffer allocation is the expected amount of buffer space required to meet a desired packet loss rate of the connection. During processing, the longest weighted queue length among all connection queues sharing the buffer space, and an identification of the corresponding connection, are maintained and updated. In the advantageous embodiment described herein, whenever there is a change in weighted queue length of a connection queue, it is compared to the current value of the longest weighted queue length. If the changed queue length is greater than the current value, then the longest weighted queue length is updated to the new value. Otherwise, no update is needed. Although this approach does not produce the exact longest weighted queue length all the time, it provides a very close approximation and can greatly reduce the implementation complexity by avoiding sorting. When a new data packet arrives and finds that the shared memory buffer is full, the connection queue having the largest weighted queue length is selected and a data packet is removed from that connection queue. This makes room in the shared buffer so that the newly arrived data packet may be stored in its appropriate connection queue. If the connection queue that the newly arrived data packet is to be stored in has the largest weighted queue length, then the newly arrived data packet is discarded.

By initializing the weighted queue lengths to different initial values, different priorities may be assigned to the connection queues. For example, suppose that there are 3 connection queues A, B, and C, each with the same assigned weight, stored in the shared buffer of a network node and that connection queue A is to be given higher priority than B and C. The weighted queue lengths of connection queues B and C may be initialized to zero and the weighted queue length of connection queue A may be initialized to some negative number. For example, suppose that it is desired that connection queue A be given a 10 data packet priority advantage over connection queues B and C. In order to implement such an advantage, the weighted queue lengths of connection queues B and C could be initialized to 0, while the weighted queue length of connection queue A is initialized to −(10×(weight assigned to the traffic class of the connection). Thus, the weighted queue length of connection queue A will not reach zero until 10 data packets have been added to connection queue A.

The invention is now described in further detail in connection with FIGS. 2 and 3. With reference to FIG. 2, each connection for which packets are being handled by the network node 100 has its own connection queue in buffer 202, and the total space available in buffer 202 is shared among all connections. The connection queues stored in buffer 202 are logically organized according to their associated output port, traffic class, and connection. Prior to describing the steps performed in accordance with the invention, terminology is defined as follows with reference to FIG. 2. A connection k of traffic class j at output port i is designated as $VC_{ijk}$. Thus, each connection $VC_{ijk}$ has a dedicated connection queue. Also in accordance with the invention, weighted queue lengths are used in order to implemented the inventive push-out technique for buffer memory management as follows. For each connection queue, an associated weighted queue length, WQ, is maintained. Thus, the weighted queue length for the connection queue of connection $VC_{ijk}$ is designated as $WQ_{ijk}$. Each traffic class at a particular output port is associated with a weight. Thus, the weight of traffic class j at output port i is designated as $w_{ij}$.

The steps performed by the network node 100 in accordance with the present invention are shown in the flowchart of FIG. 3. In step 302 a new data packet associated with connection $VC_{ijk}$ is received by the network node 100. In step 304 it is determined whether the total space in buffer 202 is full. If it is not, then control passes to step 312 in which the received data packet is added to the connection queue of connection $VC_{ijk}$. In step 314 the weighted queue length $WQ_{ijk}$ of the connection queue for connection $VC_{ijk}$ is incremented by the weight $w_{ij}$, which is the weight associated with the traffic class j at output port i. In step 316 it is determined whether $WQ_{max}$ is less than $WQ_{ijk}$, where $WQ_{max}$ represents the largest weighted queue length of all the connection queues in buffer 202. Thus, the test in step 316 determines whether the addition of a data packet to the connection queue of connection $VC_{ijk}$ results in that connection queue now having the greatest weighted queue length. If the test in step 316 is yes, then in step 318 $WQ_{max}$ is set to $WQ_{ijk}$ and in step 320 $I_{max}$ is set to the index (ij,k), where $I_{max}$ stores the index of the connection with the maximum weighted queue length, and the method ends in step 322. If the test in step 316 is no, the method ends in step 322 without performing steps 318 and 320.

Returning now to the test in step 304, if it is determined that the buffer 202 is full, then control passes to step 306 in which it is determined whether $I_{max}$ contains the index of the connection associated with the newly arrived data packet. If the result is yes, then the connection queue into which the newly arrived data packet is to be added has the largest weighted queue length, and the data packet is discarded in step 324 and the method ends in step 322. If the result of step 306 is no, then in step 308 a data packet is removed from the connection queue having the largest weighted queue length, that is, the connection queue of the connection (VC) having an index of $I_{max}$. In step 310 the weighted queue length of the connection queue for which a data packet was removed, WQ having an index of $I_{max}$, is decremented by the weight w having an index of $I_{max}$ to account for the removal of the data packet. The removal of the data packet has now made room in the buffer 202 for the addition of the new data packet in the appropriate connection queue. Processing continues with steps 312 through 322 as described above.

When a data packet is removed from a connection queue because it has been transmitted to its destination by the network node, the weighted queue length of the connection queue must be decremented by an amount equal to the weight assigned to the traffic class of the connection. The steps performed by the network node 100 when a data packet is removed are shown in the flowchart of FIG. 4. In step 402 a data packet departs from the connection queue associated with connection $VC_{ijk}$. In step 404 the weighted queue length $WQ_{ijk}$ of the connection queue for connection $VC_{ijk}$ is decremented by the weight $w_{ij}$, which is the weight associated with the traffic class j at output port i. In step 406 it is determined whether $I_{max}$ contains the index of the connection associated with the removed data packet. If the result is yes, then $WQ_{max}$ is set to $WQ_{ijk}$ in step 408 and the method ends in step 410. If the result of step 406 is no, then the method ends in step 410 without performing step 408.

The invention provides many desirable features over the prior existing techniques. First, the loss priorities among output ports and traffic classes are dynamic instead of being fixed. They depend not only on the provisioned priority levels, but also on the weighted queue lengths of the connection queues. This prevents low priority classes from being starved when the traffic load of high priority classes is high, which is a common problem in prior push-out techniques. In addition, the differentiation of loss priorities among different traffic classes can be easily quantified by adjusting the associated weights. Further, the concept of weighted queue length generalizes buffer management into a framework which enables push-out to be performed globally across all connections sharing the buffer, rather than locally within the same output port or the same traffic class. This increases the degree of sharing and the efficiency of the memory management. In addition, by assigning initial values for different connections according to the nominal buffer allocations, the weighted queue length tightly couples buffer management with high-level resource allocation of the network node. This provides an effective way to differentiate traffic classes and ensure fairness among different connections.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. For example, the present invention has been described such that when a data packet arrives in a connection queue the weighted queue length is incremented by an amount equal to the weight assigned to the traffic class of the connection, and when a data packet is removed from a connection queue the weighted queue length is decremented by an amount equal to the weight assigned to the traffic class of the connection. Thus, when the buffer is full, a data packet is removed from the connection queue having the highest weighted queue length. Of course, a straightforward alternate implementation would be that when a data packet arrives in a connection queue the weighted queue length is decremented by an amount equal to the weight assigned to the traffic class of the connection, and when a data packet is removed from a connection queue the weighted queue length is incremented by an amount equal to the weight assigned to the traffic class of the connection. In such an embodiment, when the buffer is full, a data packet is removed from the connection queue having the lowest weighted queue length.

I claim:

1. A method for managing a shared memory buffer in a network node comprising the steps of:
   maintaining a weighted queue length for each of a plurality of queues stored in said shared memory buffer, said weighted queue length for each of said plurality of queues being a function of the type of data in the queue and the amount of data in the queue; and
   upon receipt of a new data item to be added to a first one of said queues when said shared memory buffer is full:
      determining a second one of said queues based on weighted queue length;
      removing a data item from said second queue; and
      adding said new data item to said first queue.

2. The method of claim 1 wherein said step of determining further comprises the step of determining a second one of said queues with a maximum weighted queue length.

3. The method of claim 1 wherein said step of determining further comprises the step of determining a second one of said queues with a minimum weighted queue length.

4. The method of claim 1 wherein said step of maintaining a weighted queue length for each of a plurality of queues stored in said shared memory buffer further comprises the step of:
   adjusting the weighted queue length of a queue when a data packet is added to or removed from said queue.

5. The method of claim 4 wherein said step of adjusting further comprises the step of:
   adjusting the weighted queue length by a weight value.

6. The method of claim 5 wherein said network node has at least first and second output ports and wherein a first traffic class has a first associated weight value at said first output port and said first traffic class has a second associated weight value different from said first weight value at said second output port.

7. The method of claim 1 further comprising the step of:
   initializing the weighted queue length for each of said queues stored in said shared memory buffer.

8. The method of claim 7 wherein the initial weighted queue length is different for at least two of said queues.

9. A network node comprising:
   at least one output port;
   a plurality of queues stored in a shared memory buffer, each of said queues associated with an output port and having an associated weighted queue length, said weighted queue length for each of said plurality of queues being a function of the type of data in the queue and the amount of data in the queue;
   at least one input port for receiving data packets, each of said data packets to be added to one of said queues;
   a processor configured to control the operation of said network node upon the receipt of a new data packet to be added to a first one of said queues, said processor configured to perform the following functions when said shared memory buffer is full:
      determining a second one of said queues based on weighted queue length;
      removing a data packet from said second queue; and
      adding said new data packet to said first queue.

10. The network node of claim 9 wherein said function of determining a second one of said queues further comprises the function of determining a second one of said queues with a maximum weighted queue length.

11. The network node of claim 9 wherein said function of determining a second one of said queues further comprises the function of determining a second one of said queues with a minimum weighted queue length.

12. The network node of claim 9 wherein said processor is further configured to perform the steps of:
   adjusting the weighted queue length of a queue when a data packet is added to or removed from said queue.

13. The network node of claim 12 wherein said processor if further configured to perform the steps of:
   adjusting the weighted queue length by a weight value.

14. The network node of claim 13 further comprising:
   at least first and second output ports wherein a first traffic class has a first associated weight value at said first output port and said first traffic class has a second associated weight value different from said first weight value at said second output port.

15. The network node of claim 9 wherein said processor is further configured to perform the steps of:
   initializing the weighted queue length for each of said queues stored in said shared memory buffer.

16. The network node of claim 15 wherein the initial weighted queue length is different for at least two of said queues.

17. A method for operation of a network node having an input port and at least one output port and a plurality of queues stored in a shared memory buffer, each of said queues associated with an output port and having an assigned traffic class, the method comprising the steps of:
   adjusting a weighted queue length of a queue by a weight value when adding a data packet to or removing a data packet from said queue;
   upon receipt of a new data packet to be added to a first queue when said shared memory buffer is full:

determining a second queue based on weighted queue length;

removing a data packet from said second queue; and adding said new data packet to said first queue.

18. The method of claim 17 wherein said step of determining a second queue further comprises the step of determining a second queue having a maximum weighted queue length.

19. The method of claim 17 wherein said step of determining a second queue further comprises the step of determining a second queue having a minimum weighted queue length.

20. The method of claim 17 wherein said weight values are based on traffic class.

21. The method of claim 17 wherein said weight values are based on output port.

22. The method of claim 17 wherein said weight values are based on both output port and traffic class.

23. The method of claim 17 further comprising the step of:

initializing the weighted queue lengths of said queues.

24. The method of claim 23 wherein at least two of said queues are initialized with different weighted queue lengths.

25. The method of claim 1, wherein said weighted queue length for each of said plurality of queues is a function of the number of data items in each queue times the weight assigned to the data items of that queue.

26. The method of claim 1, wherein, if said second one of said queues is determined to be said first one of said queues, said new data item is discarded without removing said data item from said second queue.

27. The method of claim 7, wherein the weighted queue length is initialized based on an expected amount of buffer space required to meet a desired data item loss rate.

28. The network node of claim 9, wherein said weighted queue length for each of said plurality of queues is a function of the number of data packets in each queue times the weight assigned to the data packets of that queue.

29. The network node of claim 9, wherein, if said second one of said queues is determined to be said first one of said queues, said new data packet is discarded without removing said data packet from said second queue.

30. The network note of claim 15, wherein the weighted queue length is initialized based on an expected amount of buffer space required to meet a desired data packet loss rate.

31. The method of claim 17, wherein, if said second queue is determined to be said first queue, said new data packet is discarded without removing said data packet from said second queue.

32. The method of claim 23, wherein the weighted queue length is initialized based on an expected amount of buffer space required to meet a desired data packet loss rate.

* * * * *